D. Pittman,
Jaw Trap,

Nº 32,486. Patented June 4, 1861.

Witnesses.

Inventor.
D. Pittman
per Munn & Co
Attorneys

UNITED STATES PATENT OFFICE.

DECATUR PITTMAN, OF FORT MADISON, IOWA.

ANIMAL-TRAP.

Specification of Letters Patent No. 32,486, dated June 4, 1861.

*To all whom it may concern:*

Be it known that I, DECATUR PITTMAN, of Fort Madison, in the county of Lee and State of Iowa, have invented a new and Improved Animal-Trap; and I do hereby declare that the following is a full, clear, and exact description thereof, reference being had to the accompanying drawing, making a part of this specification, in which—

Figure 3:
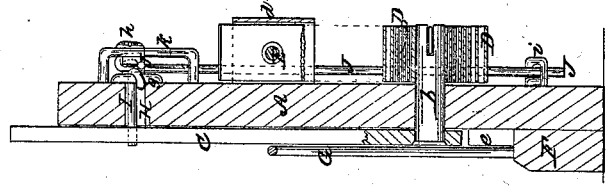
Figure 2:
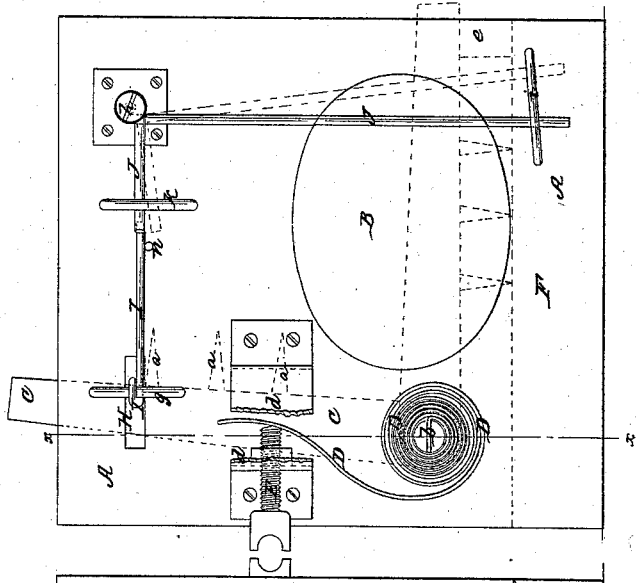
Figure 1:
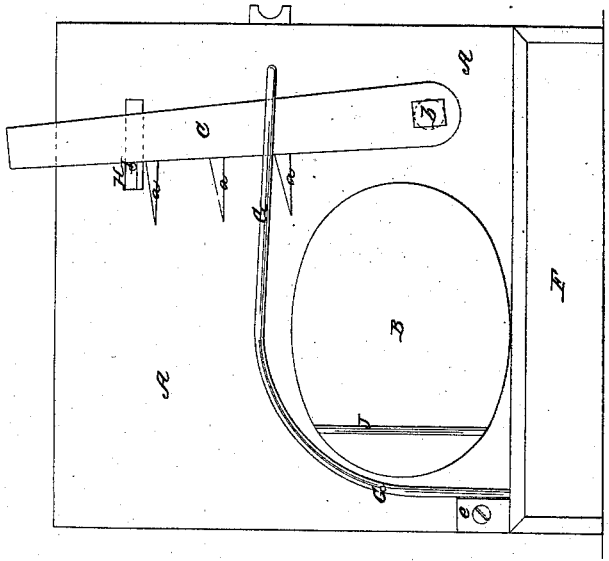

Figure 1 is a front view of the improved trap when it is set. Fig. 2 is a back view of Fig. 1. Fig. 3 is a section through Fig. 2 in the vertical plane indicated by red line $x$, $x$ thereon.

Similar letters of reference indicate corresponding parts in the three figures.

This invention relates to an improved trap for catching and killing large or very small animals.

It consists in combining with a board having a hole through it, a lever, which is arranged across the hole in the board so that when the animal enters the hole the lever will be pushed upward, and detach a trigger which will let fly a spiked bar that is acted upon by a strong spring, and spike the animal securely to the trap, all as will be hereinafter fully explained.

To enable those skilled in the art to make and use my invention, I will proceed to describe its construction and operation.

A is a board of a suitable width, length and thickness having a hole B cut through it large enough to admit the animals which it is desired to entrap.

C is a strong iron bar having spikes $a$, $a$, $a$, projecting from its edge which spikes are intended to pin the animal to the trap and kill it. Bar C is secured at one end—its lower end to a pin $b$ and pin $b$ has a strong spring D coiled around it as shown in Figs. 2 and 3 of the drawings.

One end of spring D is secured to the pin $b$ and the other end of this spring is curved as shown in Fig. 2, and passes through a guard plate $d$, where it is acted upon by an adjusting screw E, by which the action of the spring D may be strengthened at pleasure as will be hereinafter further described. Spring D, guard $d$, and adjusting screw E, are arranged on the back part of the board A, while the spiked bar C is on the front part of the board A.

F is a cleat or strip of wood which is secured to the outside of the board A in such a position as to receive the force of bar C. A piece of rubber $c$ is secured near the upper end of strip F, against which the upper end of bar C strikes when this bar is detached from its trigger. This rubber block prevents the spikes $a$, $a$, $a$ from being driven into the strip F. The curved guard G over the bar C is used merely to keep this bar against the board A, and to prevent any liability of the animal bending the bar in its exertions to get away when caught by the spikes $a$, $a$, $a$.

H is a slot which is cut in the board A through which slot one end of the trigger I passes. The trigger is a stiff right angular rod pivoted at its angle to a fixed rod $g$, passing across the slot H on the back part of the board A, as shown in Figs. 2 and 3 of the drawings.

J is a right-angular lever pivoted at its angle to the back of the board A, at $h$; one arm of lever J, is quite long, and this arm passes across the top (or bottom as the case may be) of hole B, and its end works under a guard $i$ as shown in Figs. 2 and 3. The short arm of lever J also passes under a guard $k$ which supports this end of the lever when the trap is set.

A pin $n$ is driven into the back of board A alongside of the long arm of the trigger I, for preventing this arm from moving sidewise when the long arm of lever J is raised by the animal entering the trap. The long arm of the trigger I and the short arm of lever J, pass each other so that the ends of these two arms can be put one on the other as shown in Fig. 2 for setting the trap. To set this trap the bar C is drawn back to the position represented in Figs. 1 and 2 and the short arm of the trigger I is thrown out so that the short arm of lever J can be put over the long arm of the trigger I, as shown in Fig. 2. The trigger will now be held by the short arm of lever J, and this trigger will hold the bar C as above described. The trap can now be placed in any situation where the animals to be caught are most likely to be found. Over a rat hole, or over a hole in a fallen tree or other desirable place where the animal will attempt to pass through the hole B in board A. When the animal passes either over or under the long arm of lever J, and moves this arm very slightly the trigger I will be released and the spring D will force the spiked bar C down over the hole B and spike the animal in the trap.

The power of spring D may be increased or diminished at pleasure by means of the adjusting screw E which acts upon the curved end of this spring. The facility by which I am enabled to adjust the strength of spring D is very useful in my trap as a trap which is made large enough to catch minks will answer for smaller animals by regulating the strength of the spring D.

Having thus described my invention, what I claim as new and desire to secure by Letters Patent is—

The animal trap herein described consisting of a board A having a hole B through it and the spiked bar C spring D adjusting screw E, trigger I and lever J, all combined and arranged as herein set forth.

DECATUR PITTMAN.

Witnesses:
N. McCULLOUGH,
WILLIAM GREEN.